(12) United States Patent
Kotani et al.

(10) Patent No.: US 8,498,767 B2
(45) Date of Patent: Jul. 30, 2013

(54) POWER-SUPPLY CONTROL APPARATUS OF VEHICLE

(75) Inventors: Kazuya Kotani, Hiroshima (JP); Hideki Sanai, Hiroshima (JP); Takeharu Yamashita, Hiroshima (JP); Masayoshi Takahashi, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 13/474,327

(22) Filed: May 17, 2012

(65) Prior Publication Data

US 2012/0296506 A1     Nov. 22, 2012

(30) Foreign Application Priority Data

May 17, 2011   (JP) .................... 2011-110436

(51) Int. Cl.
    *H02P 1/00*      (2006.01)
(52) U.S. Cl.
    USPC .......................................... 701/22; 318/139
(58) Field of Classification Search
    USPC .. 701/22, 48, 37, 31.7, 46; 315/151; 320/109;
        318/151, 139, 49, 282, 376; 307/10.1; 361/752;
            428/624; 180/65.29, 306, 62.75, 65.8, 169;
                                      477/110
See application file for complete search history.

(56) References Cited

U.S. PATENT DOCUMENTS

| | | | |
|---|---|---|---|
| 8,099,203 B2 * | 1/2012 | Miller et al. ................. | 701/22 |
| 8,290,653 B2 * | 10/2012 | Hofbauer ..................... | 701/22 |
| 2008/0243324 A1 * | 10/2008 | Harris .......................... | 701/22 |
| 2009/0024267 A1 * | 1/2009 | Kawai .......................... | 701/22 |
| 2009/0306841 A1 * | 12/2009 | Miwa et al. .................. | 701/22 |
| 2010/0121507 A1 * | 5/2010 | Ishii et al. .................... | 701/22 |
| 2010/0121511 A1 * | 5/2010 | Onnerud et al. ............. | 701/22 |
| 2010/0204860 A1 * | 8/2010 | Mitsutani ..................... | 701/22 |
| 2011/0082611 A1 * | 4/2011 | Shiba ........................... | 701/22 |
| 2011/0172861 A1 * | 7/2011 | Starr ............................ | 701/22 |
| 2011/0246013 A1 * | 10/2011 | Yee et al. ..................... | 701/22 |
| 2011/0313608 A1 * | 12/2011 | Izumi et al. .................. | 701/22 |
| 2012/0310462 A1 * | 12/2012 | Kuroda et al. ............... | 701/22 |
| 2013/0013137 A1 * | 1/2013 | Saint-Macary .............. | 701/22 |

FOREIGN PATENT DOCUMENTS

| JP | 2009-142089 A | 6/2009 | |
|---|---|---|---|
| JP | 2009142089 | * 6/2009 | ................. 701/22 |

* cited by examiner

*Primary Examiner* — Thomas Black
*Assistant Examiner* — Robert Payne
(74) *Attorney, Agent, or Firm* — Studebaker & Brackett PC

(57) ABSTRACT

A power-supply control apparatus of a vehicle comprises a first electricity-storage device to supply electric power to a starter for starting engine, a generator to convert kinetic energy of the vehicle during a vehicle deceleration to electric energy for energy recovery, a second electricity-storage device coupled to the generator to store the electric power from the generator thereat, a feeder circuit coupling the second electricity-storage device to an electric load with a relatively-small electric-load capacity via a DC/DC convertor, a coupling line coupling the second electricity-storage device to the first electricity-storage device via a coupling relay, and a controller to control the electric power passing through the feeder circuit and the coupling line, wherein the controller executes a control to make the coupling relay on the coupling line in an OFF state when the starter operates.

12 Claims, 8 Drawing Sheets

POWER-SUPPLY CONTROL APPARATUS OF VEHICLE

BACKGROUND OF THE INVENTION

The present invention relates to a harness arrangement structure of a vehicle which interconnects a battery device and an electric-power control device of a vehicle.

The present invention relates to a power-supply control apparatus of a vehicle which comprises a first electricity-storage device to supply electric power to a starter for starting engine, a generator to convert kinetic energy of the vehicle during a vehicle deceleration to electric energy for energy recovery, and a second electricity-storage device coupled to the generator to store the electric power from the generator thereat.

Conventionally, a power supply device for vehicle which reliably boosts battery power supply without being affected by a rise in ground potential caused by a rush current to an electric load, such as a head lamp as well as reliably supplies power to the electric load when restarting an engine from the time when the engine is stopped is known as disclosed in Japanese Patent Laid-Open Publication No. 2009-142089. This power supply device for vehicle comprises a battery to supply electric power to a starter of an engine when restarting the automatically-stopped engine, a step-up converter to step up a battery voltage during operation of the starter so as to supply power to a first electric load, and an operation delay control means which executes an operation delay control to delay operation of a second electric load coupled to the battery so as to allow a rush current to flow therein when a power supply switch is turned on. Herein, the operation delay control means executes the operation delay control during operation of the step-up converter.

In the power supply device disclosed in the above-described patent document, the direct-electric current from the battery is supplied to the first electric load, such as an audio device or a navigation device, and the second electric load, such as a head lamp. Accordingly, there are demerits in that a large-capacity battery and a power-supply line including the set-up convertor which allows the large amount of electricity flowing through it may be required to be used despite providing the above-described set-up convertor and operation delay control means, which improperly causes a large-sized device and a manufacturing-cost increase.

SUMMARY OF THE INVENTION

The present invention has been devised in view of the above-described problem, and an object of the present invention is to provide a power-supply control apparatus of a vehicle which can properly supply the electric power to the electric load provided in the vehicle with a simple constitution.

According to the present invention, there is provided a power-supply control apparatus of a vehicle, comprising a first electricity-storage device to supply electric power to a starter for starting engine, a generator to convert kinetic energy of the vehicle during a vehicle deceleration to electric energy for energy recovery, a second electricity-storage device coupled to the generator to store the electric power from the generator thereat, a feeder circuit coupling the second electricity-storage device to an electric load via a DC/DC convertor, a coupling line coupling the second electricity-storage device to the first electricity-storage device via a coupling relay, and a controller to control the electric power passing through the feeder circuit and the coupling line, wherein the controller executes a control to make the coupling relay on the coupling line in an OFF state when the starter operates.

According to the present invention, since the coupling relay on the coupling line is made in the OFF state when the starter operates, thereby stopping the supply of the electric power from the second electricity-storage device to the first electricity-storage device and the like, any improper situation in which the sufficient electric current may not be supplied to the electric load due to a lack of electric power of the second electricity-storage device can be effectively prevented from occurring when starting the engine by operating the starter, so that it can be effectively prevented that the electric load does not work against the grain.

Herein, the above-described electric load may comprise plural electric loads with a relatively-small electric-load capacity, such as such as a navigation device, an audio device, a meter unit and a room illumination device.

According to an embodiment of the present invention, the power-supply control apparatus of a vehicle further comprises an auto-stop controller to automatically stop the engine when a condition for automatically stopping is met and to automatically restart the engine by operating the starter when a condition for automatically restarting is met, and a voltage detector to detect a voltage of the second electricity-storage device, wherein the auto-stop controller is prohibited from automatically stopping the engine in a case in which the voltage of the second electricity-storage device detected by the voltage detector is a specified value or smaller. Thereby, since the auto-stop control by the auto-stop controller is prohibited in a case in which the remaining electric power of the second electricity-storage device becomes so small that the electric power consumed by the electric load may not be properly supplied when restarting the engine, any improper situation in which the electric load does not work, which may be caused by the lack of sufficient electric-current supply to the electric load, can be effectively prevented from occurring when restarting the engine.

According to another embodiment of the present invention, the second electricity-storage device is a capacitor which has a quicker charge-and-discharge performance than the first electricity-storage device does. In a case in which the second electricity-storage device is comprised of the capacitor which has the quicker charge-and-discharge performance than a lead-acid battery or the like, the electric current generated by the generator can be quickly supplied to the second electricity-storage device for charging. Further, the electric power stored at the second electricity-storage device is supplied to the electric load with a proper reduction to an appropriate value by means of the DC/DC convertor, so that the electric power can be effectively used.

According to another embodiment of the present invention, the controller executes a control to stop outputting of the DC/DC convertor in a case in which the electric power stored at the second electricity-storage device is consumed and decreased below a specified value necessary for restarting engine when the engine is in an automatically-stop state. Thereby, consumption of the electric power by the second electricity-storage device is restrained, so that it can be prevented that the first electric load does not work due to a lack of electric power of the second electricity-storage device when restarting the engine after the engine stopping automatically.

According to another embodiment of the present invention, when the outputting of the DC/DC convertor is stop, the electric power from the first electricity-storage device is supplied to said electric load. Thereby, when restarting the engine after the engine stopping automatically, the lack of electric power of the second storage electricity-storage device can be effectively restrained from occurring, so that it can be prevented that the first electric load does not work.

According to another embodiment of the present invention, in a case in which a large amount of electric current is consumed by the first electric load, the controller executes a control to supply an electric current generated by the generator to the first electricity-storage device so that consumption of the electric power by the second electricity-storage device is restrained. Thereby, it can be prevented that the sufficient electric current is not supplied to the electric load from the second electric-storage device via the DC/DC convertor during the engine stop so that the electric load does not work properly, or that the large amount of electric current is supplied to the electric load from the first electricity-storage device so that the enough electric power of the first electricity-storage device for the engine restarting is not be ensured.

Other features, aspects, and advantages of the present invention will become apparent from the following description which refers to the accompanying drawings.

DETAILED DESCRIPTION OF THE INVENTION

Hereinafter, a preferable embodiment of the present invention will be described referring to the accompanying drawings.

Figure 1:
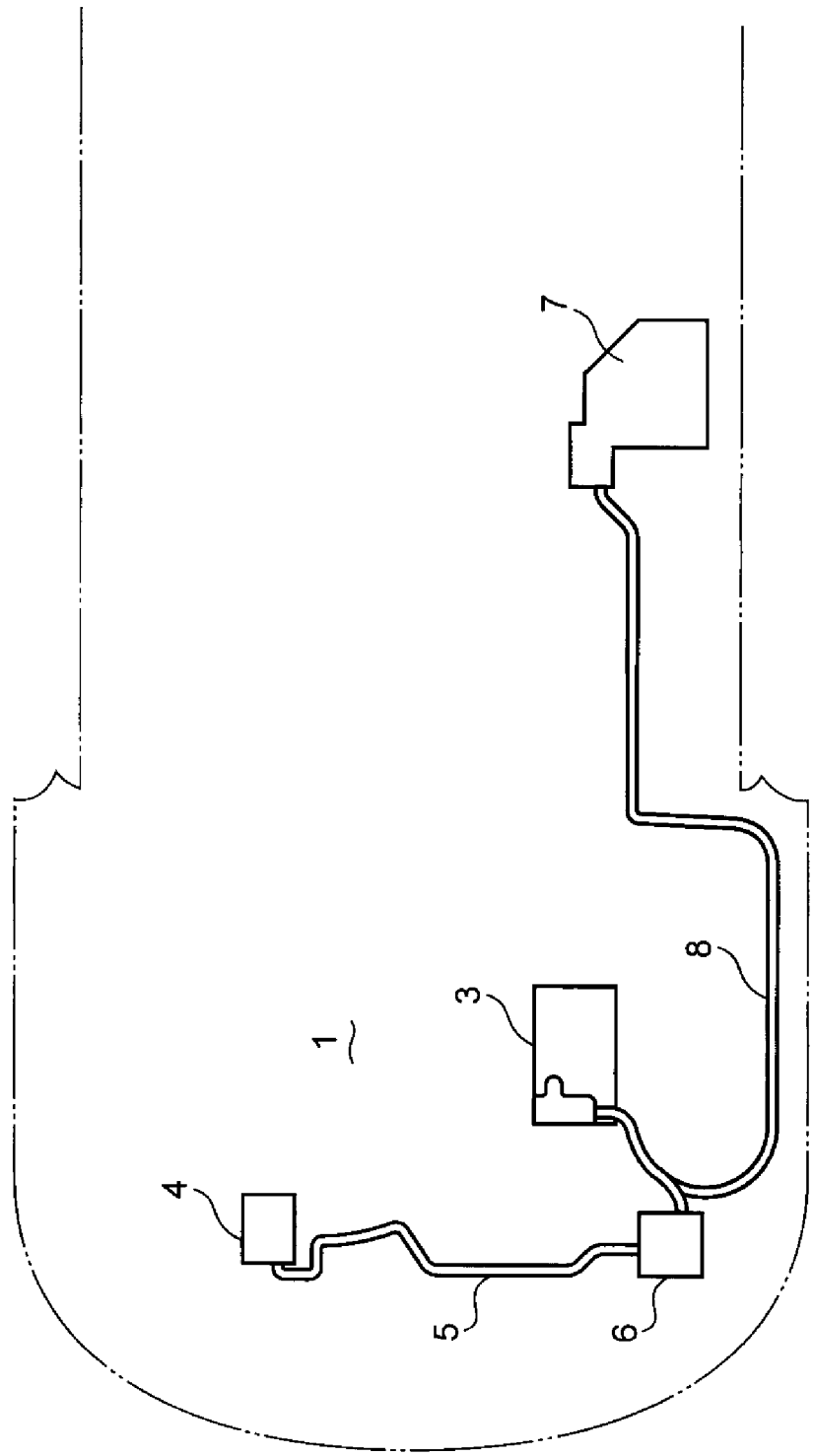
FIG. 1 is a plan view showing a schematic structure of a vehicle equipped with a power-supply control apparatus according to the present invention.
Figure 2:
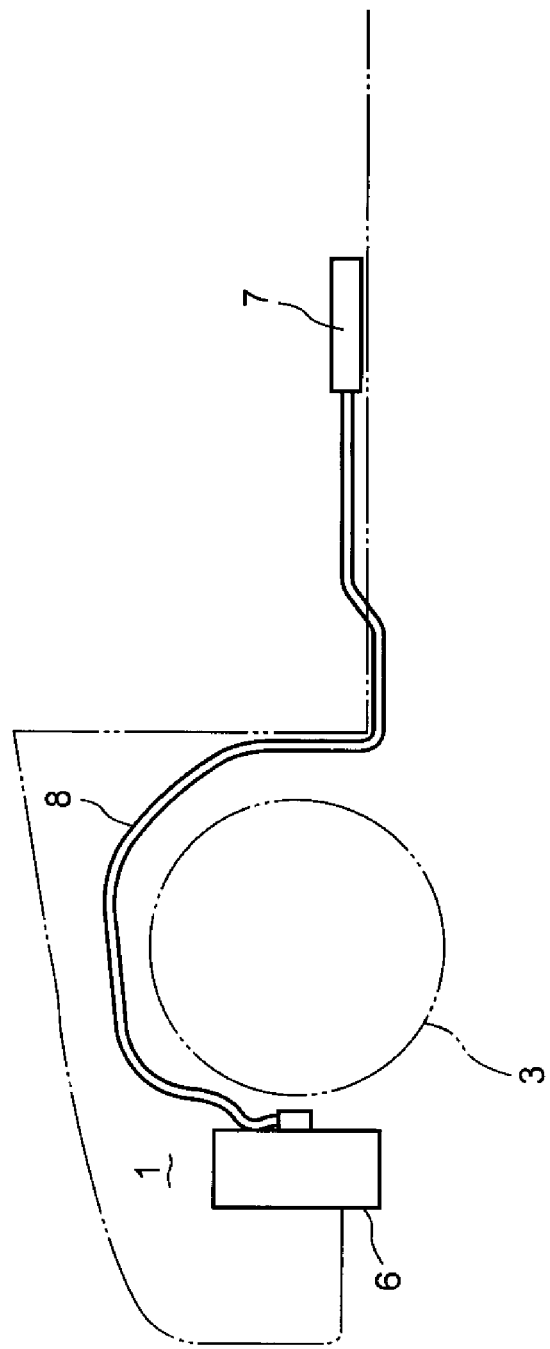
FIG. 2 is a side view showing the schematic structure of the vehicle equipped with the power-supply control apparatus according to the present invention.

FIGS. 1 and 2 show a front structure of a vehicle equipped with a power-supply control apparatus according to the embodiment of the present invention. An engine (internal combustion engine) and a transmission, not illustrated, are disposed in an engine room 1 located at a front portion of the vehicle. On one side (a left side in the present embodiment) in the engine room 1 is disposed a first electricity-storage device 3 which is comprised of a lead-acid battery or the like which can store electric power for a long term. On the other side (a right side) in the engine room 1 is disposed a generator 4 which is comprised of an alternator which converts kinetic energy of the vehicle during a vehicle deceleration to electric energy for energy recovery.

A second electricity-storage device 6 which is coupled to the generator 4 via a first harness 5 is disposed at a specified position which is on the other side in the engine room 1 and in front of a front tire 2. The second electricity-storage device 6 is comprised of a capacitor in which plural capacitor cells with electric double layers are connected in series, which has a quicker charge-and-discharge performance than the first electricity-storage device 3. The electric power generated by the generator 4 comprised of the alternator which is driven during a vehicle deceleration and the like is supplied to the second electricity-storage device 6 via the first harness 5 so that the second electricity-storage device 6 can be charged at an appropriate voltage, 14-25V, for example.

A control unit 7 which comprises a CPU, various memories and the like which constitute an auto-stop controller 29 and a controller 30, which will be described below, is disposed on a floor panel below a driver's seat and a passenger's (assistant's) seat in a vehicle compartment located in back of the engine room 1. A second harness 8 which couples the first electricity-storage device 3 to the control unit 7 and the like is arranged along a wheel arch formed above the front tire 2.

Figure 3:
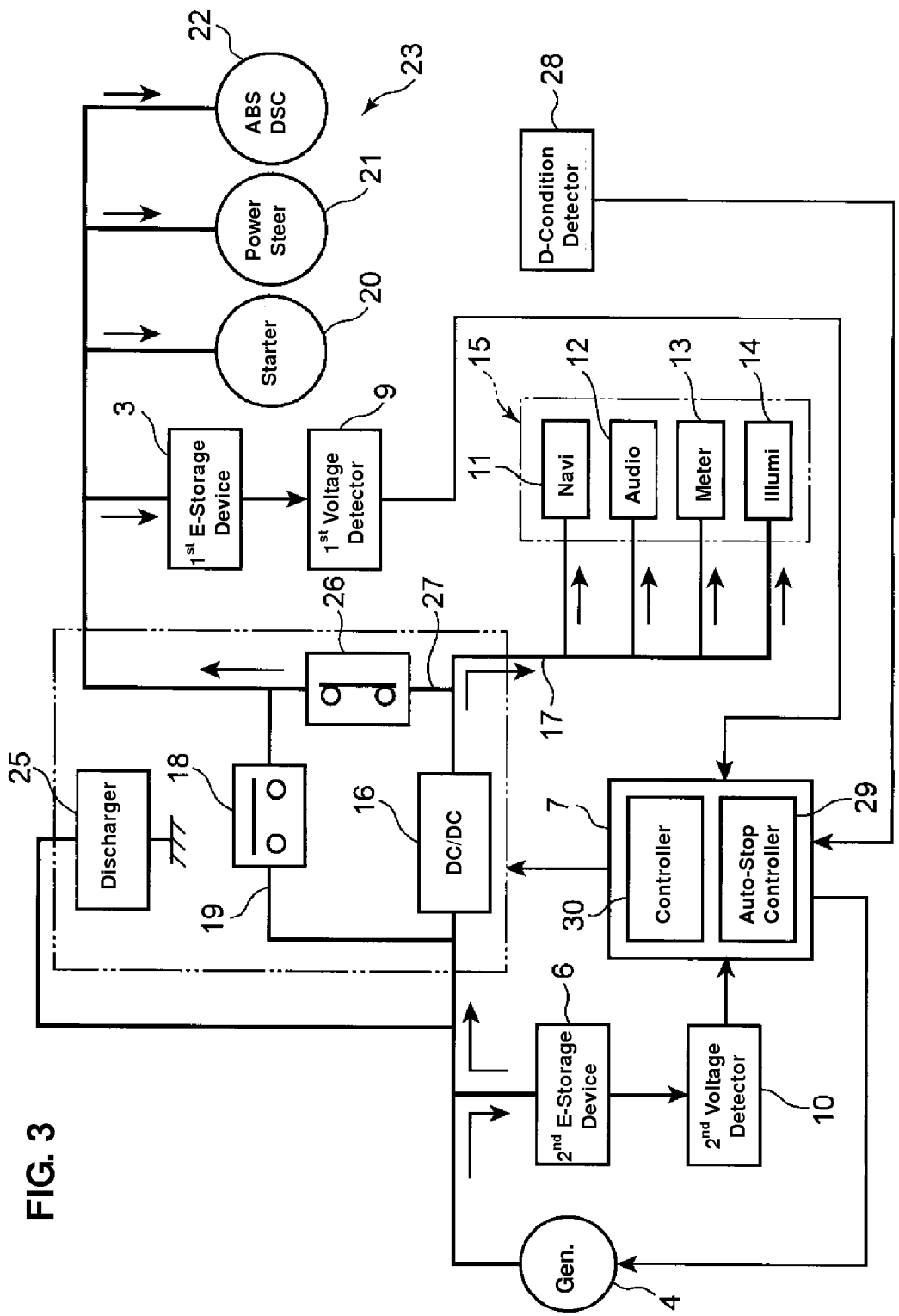
FIG. 3 is a block diagram showing an embodiment of the power-supply control apparatus.

FIG. 3 is a block diagram showing a concrete constitution of the power-supply control apparatus of the vehicle according to the present invention, which comprises a first voltage detector 9 to detect the voltage of the first electricity-storage device 3, a second voltage detector 10 to detect the voltage of the second electricity-storage 6, and a first feeder circuit 17 which couples a first electric load 15 which includes various electric loads with a relatively-small electric-load capacity, such as a navigation device 11, an audio device 12, a meter unit 13 and a room illumination device 14, to the second electricity-storage 6 via a DC/DC convertor 16. Herein, the DC/DC convertor 16 properly decreases the voltage of the electric power from the second electricity-storage device 6 to an appropriate value, 14V, for example, corresponding to an operational voltage of the first electricity-storage device 15.

The first electricity-storage device 3 and the second electricity-storage device 6 are coupled to each other via a second feeder circuit 19 including a bypass relay 18 which is arranged in parallel with the DC/DC convertor 16 on the first feeder circuit 17. Further, a second electric load 23 which includes various electric loads with a relatively-large electric-load capacity, such as a starter for starting engine 20, a power steering device 21, and an ABS/DSC device 22, and the above-described second electricity-storage device 6 are coupled via the second feeder circuit 19.

A discharger 25 is coupled to the second electricity-storage device 6. The discharger 25 includes a resistance circuit to discharge the electricity power of the second electricity-storage device 6. When it is detected by the second voltage detector 10 that the voltage of the second electricity-storage device 6 is a predetermined standard value (about 16V, for example) or greater at the timing an ignition switch is tuned off and thereby the engine stops, the discharger 25 discharges the electric power stored at the second electricity-storage device 6 through grounding via a vehicle body in accordance with a control signal outputted from the control unit 7.

The first feeder circuit 17 and the second feeder circuit 19 are connected at respective portions downstream of the DC/DC convertor 16 and the bypass relay 18 via the coupling line 27 including a coupling relay 26 thereon. The control unit 7 comprises the auto-stop controller 29 which automatically stops the engine and restarts the engine in accordance with detection signals of a driving-condition detector 28, such as a brake switch, an accelerator switch, and a wheel-speed sensor, and the controller 30 which controls the electric power passing through the first feeder circuit 17, the second feeder circuit 19 and the coupling line 27 and operates the generator 4 and the discharger 25 at need, by executing ON/OFF controls of the bypass relay 18 and the coupling relay 26 or the like.

The auto-stop controller 29 automatically stops the engine by stopping a fuel injection at the timing it is detected that a condition for automatically stopping is met, for example, at the timing it is determined that the vehicle needs to be stopped temporally at an intersection or somewhere, and automatically restarts the engine by operating the starter 20 at the timing a condition for restating is met when a vehicle start operation is conducted or the like.

In a normal state, as shown in FIG. 3, the controller 30 executes its control to make the bypass relay 18 on the second feeder circuit 19 in an OFF state and make the coupling relay 26 on the coupling line 27 in an ON state. During a vehicle deceleration or a vehicle traveling on a downhill in the above-described state, the generator 4 generates the electric current of about 25V and this generated electric current is supplied to and stored at the second electricity-storage device 6, thereby charging the second electricity-storage device 6. The electric power stored at the second electricity-storage device 6 is supplied to the first electric load 15 of the navigation device 11 and the like, with a voltage reduction to about 14V by means of the DC/DC convertor 16, via the first feeder circuit 17 s well as to the first electricity-storage device 3 and the second electric load 23 via the coupling line 27. Thus, the electric power can be effectively used.

Figure 4:
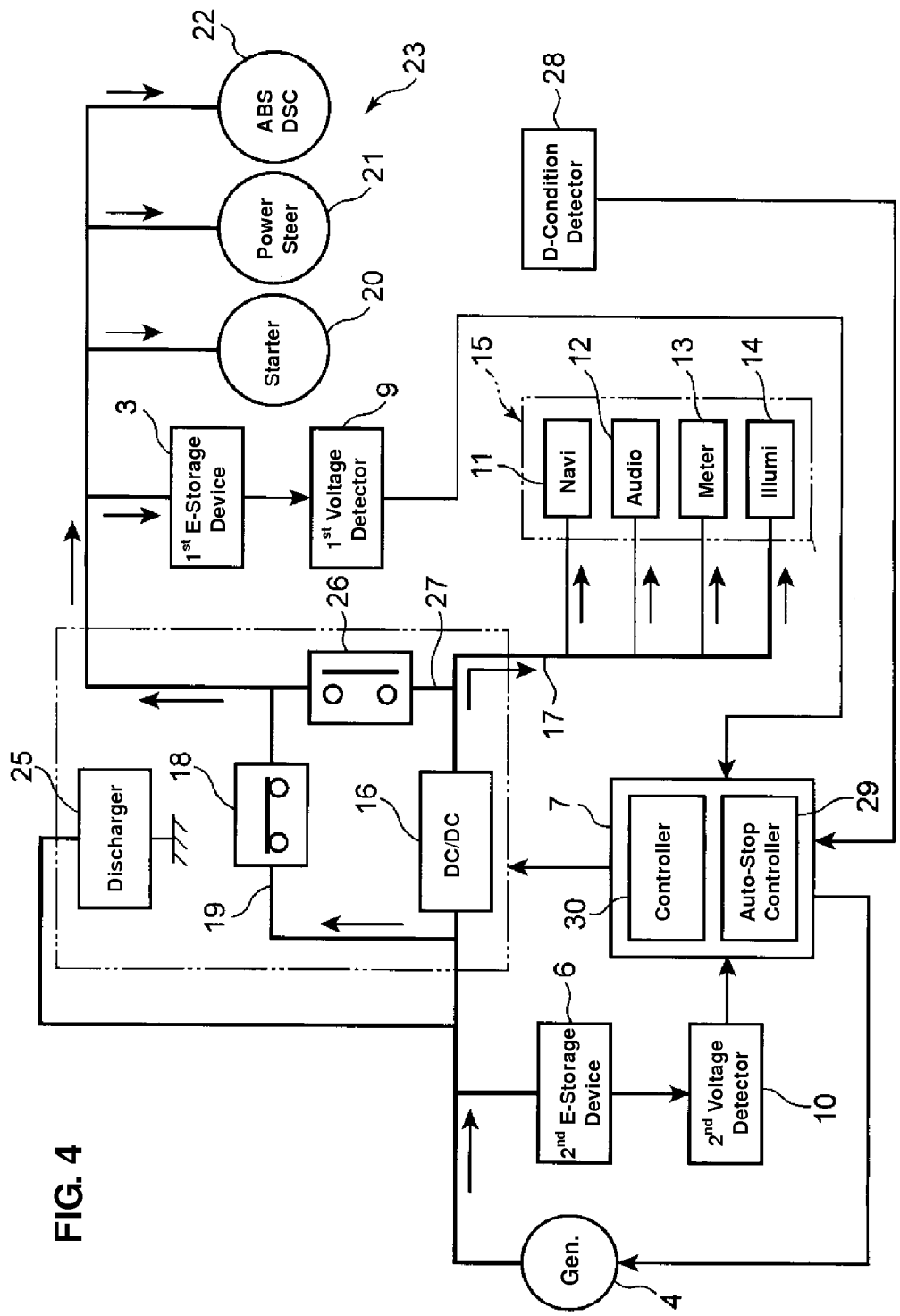
FIG. 4 is a block diagram showing a state in which a coupling relay is in an ON state and a bypass relay is in an ON state.

Then, when the electric power of the second electricity-storage device 6 is consumed to some extent so that the voltage decreases to a low value less than 14V, for example, during the engine operation, as shown in FIG. 4, the controller 30 executes its control to make the bypass relay 18 on the second feeder circuit 19 in an ON state and make the coupling relay 26 on the coupling line 27 in an OFF state. In this state, the generator 4 is driven by the engine of the vehicle so as to generate the electric current with the voltage of about 12-14V, and this generated electric current is supplied to the second electricity-storage device 6, thereby charging the second electricity-storage device 6. Further, the generated electric current of the generator 4 is supplied to the first electric load 15 of the navigation device 11 and the like via the first feeder circuit 17 as well as to the second electricity-storage device 23 of the power steering device 21 and the like and the first electricity-storage device 3 via the second feeder circuit 19, thereby charging the first electricity-storage device 3 at need.

Figure 5:
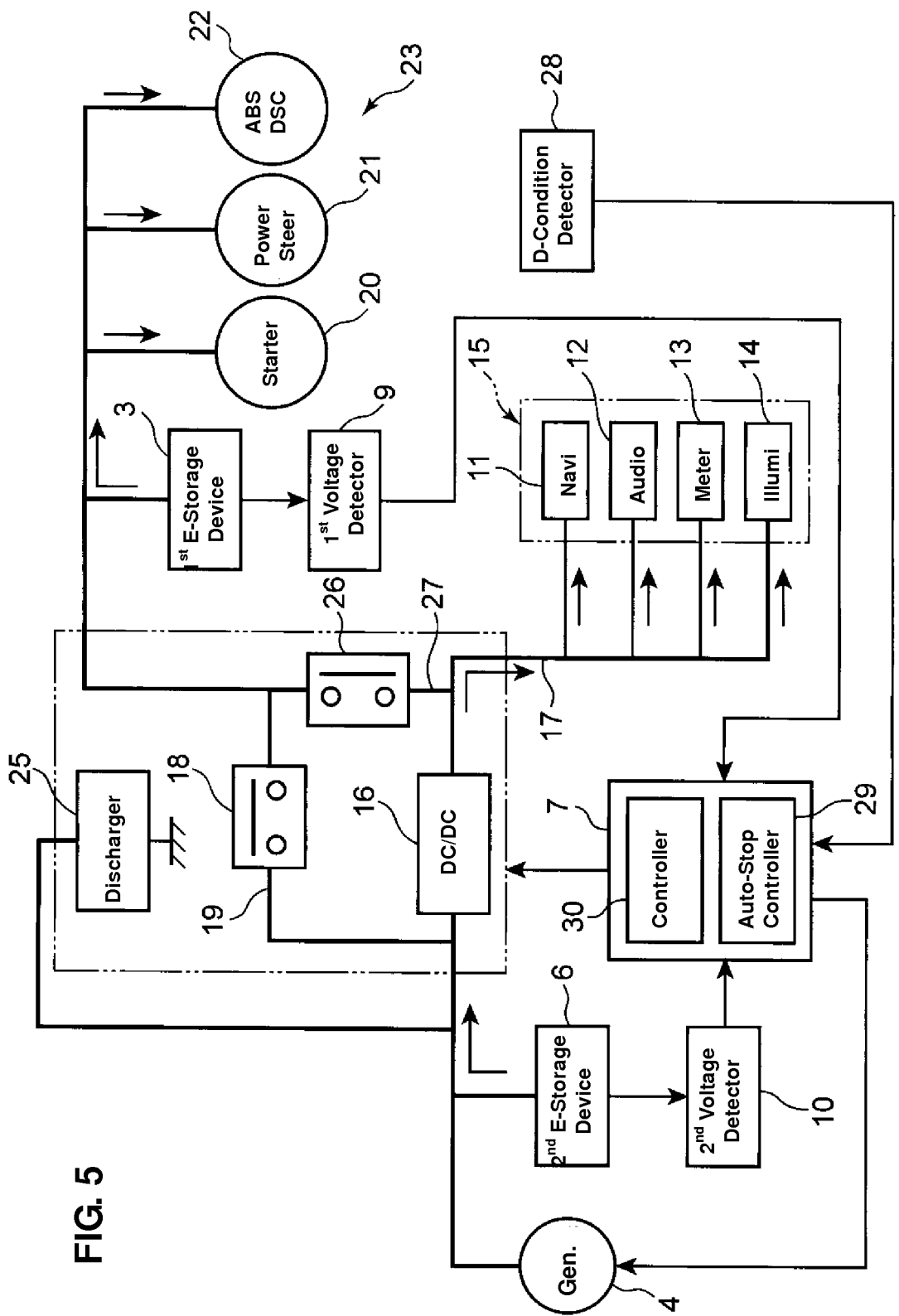
FIG. 5 is a block diagram showing a state in which the coupling relay and the bypass relay are in an OFF state.

When the starter 20 is operated and thereby the engine is restarted after the auto-stop control of the engine by the auto-stop controller 29 is executed, as shown in FIG. 5, the controller 30 executes its control to make the bypass relay 18 on the second feeder circuit 19 in the OFF state and make the coupling relay 26 on the coupling line 27 in the OFF state. Thereby, the supply of the electric power from the second electricity-storage device 6 to the second electric load 23 and the like via the coupling line 27 is stopped, and the electric power is supplied to the second electric load 23 from the first electricity-storage device 3.

Figure 6:
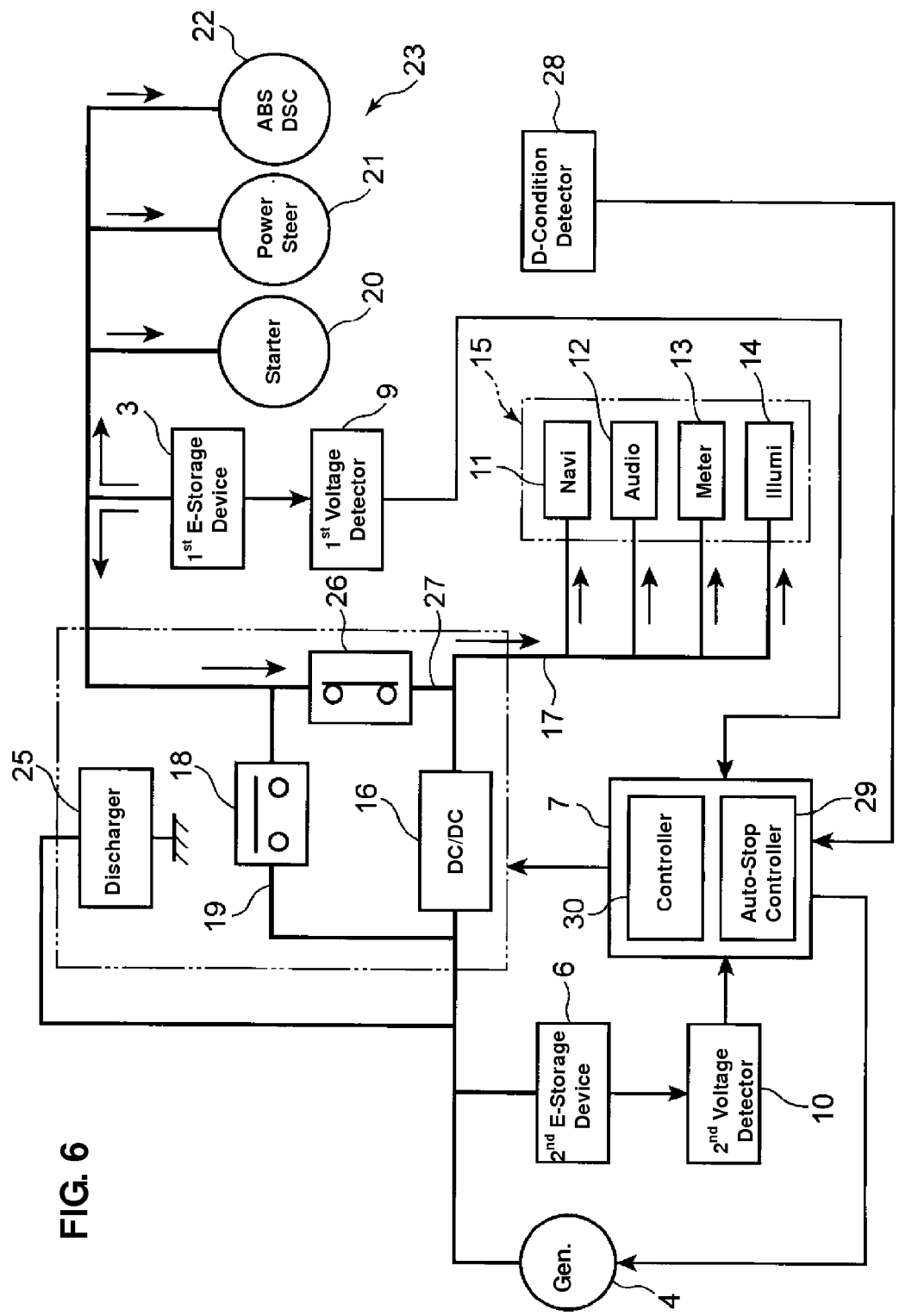
FIG. 6 is a block diagram showing a state in which outputting of a DC/DC convertor is stopped.

Further, in a case in which there occurs a concern that the above-described remaining electric power of the second electricity-storage device 6 may decrease below a consumptive electric power necessary for the engine restarting, the controller 30 executes its control to make the bypass relay 18 in the OFF state, make the coupling relay 26 in the ON state, and stop outputting of the DC/DC convertor 16. In this state, as shown in FIG. 6, the electric power from the first electricity-storage device 3 is supplied to the second electric load 23 of the power steering device 21 and the like, and the electric power from the first electricity-storage device 3 is supplied to the first electric load 15 of the navigation device 11 and the like via the coupling line 27. Thereby, the consumption of the electric power by the second electricity-storage device 6 is restrained, so that it can be prevented that the first electric load 15 of the navigation device 11 and the like do not work due to a lack of electric power of the second electricity-storage device 6 when restarting the engine after the engine auto-stop.

Figure 7:
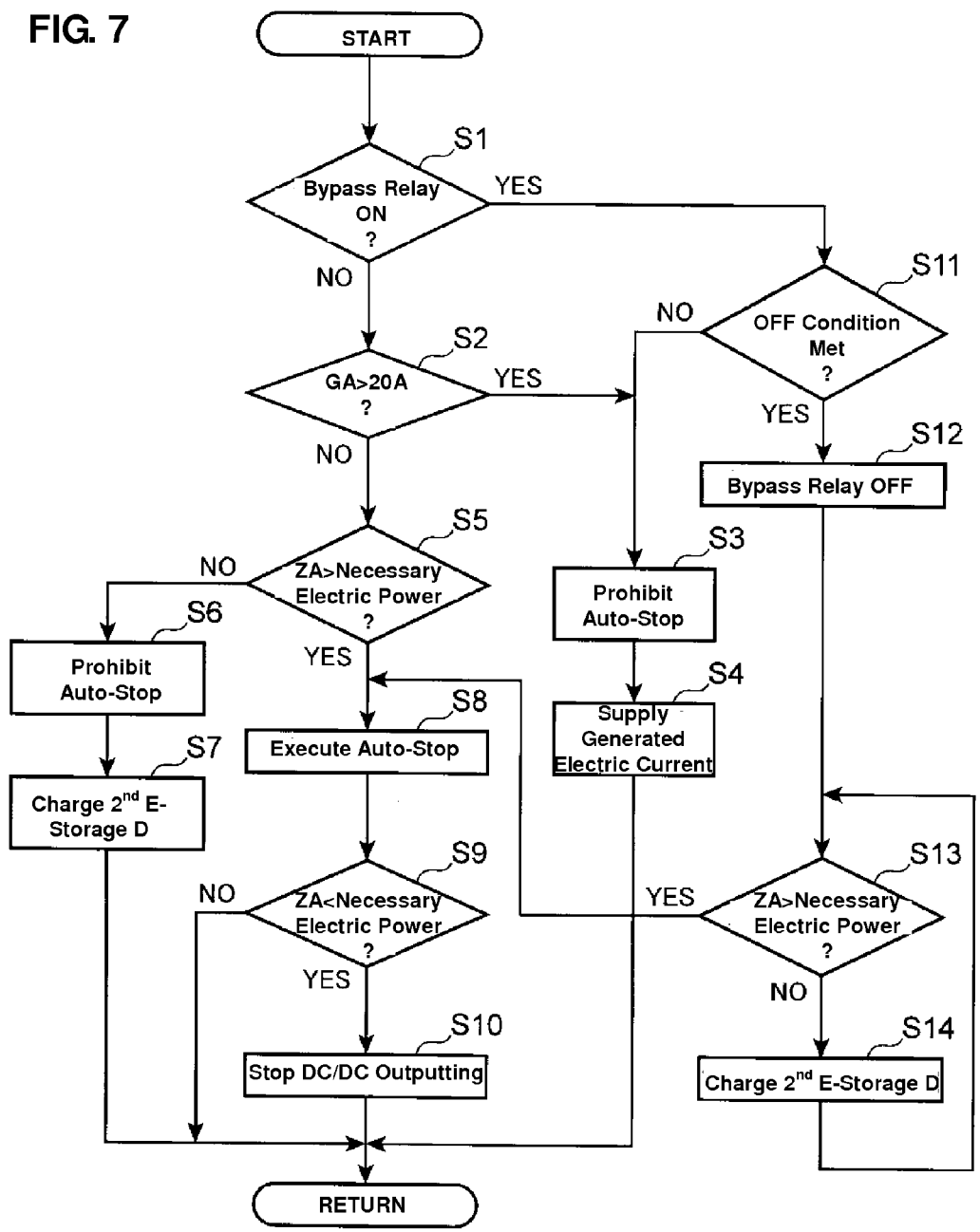
FIG. 7 is a flowchart showing a control operation of the power-supply control apparatus according to the embodiment of the present invention.

Next, operations of the control which is executed by the controller 30 when it is determined by the auto-stop controller 29 that the condition for automatically stopping engine is met will be described referring to a flowchart shown in FIG. 7. When the control sequence starts, it is determined whether or not the bypass relay 18 on the second feeder circuit 19 is in the ON state (step S1). When the determination in the step S1 is NO, that is, when the normal state in which the bypass relay 18 is in the OFF state as shown in FIG. 3 is confirmed, it is determined whether or not there is a tendency that the total value GA of the consumptive electric current of the first electric load 15 and the consumptive electric current of the second electric load 23 becomes greater than a rated output current of the DC/DC convertor 16 of about 20 A (step S2).

When the determination in the step S2 is YES, that is, when many loads of the first electric load 15 and the second electric load 23 work so that it is confirmed that there is a possibility that the total value GA may become greater than the rated current value (about 20 A), an auto-stop prohibition signal is outputted to the auto-stop controller 29 (step S3) and then the generated electric current by the generator 4 is supplied to the first electricity-storage device 3, the second electric load 23, and the first electric load 15, respectively (step S4).

That is, by making the bypass relay 18 on the second feeder circuit 19 in the ON state as well as the coupling relay 26 on the coupling line 27 in the OFF state as shown in FIG. 4 and generating the electric current with the voltage of about 12-14V by the generator 4 driven by the engine, the generated electric current is supplied to the first electricity-storage device 3 and the second electric load 23 of the power steering device 21 and the like via the second feeder circuit 19 as well as to the first electric load 15 of the navigation device 11 and the like via the first feeder circuit 17.

As described above, in a case in which the large amount of electric current is consumed by the first electric load 15 and the second electric load 23, the control to supply the generated electric current by the generator 4 to the electricity-storage device 3 and the second electric load 23 via the second feeder circuit 19 is executed, and the consumption of the electric power by the second electricity-storage device 6 is restrained. Thereby, it can be prevented that the sufficient electric current is not supplied to the respective electric loads 15, 23 from the second electric-storage device 6 via the DC/DC convertor 16 during the engine stop so that these electric loads 15, 23 do not work properly, or that the large amount of electric current is supplied to the electric loads 15, 23 from the first electricity-storage device 3 so that the enough electric power of the first electricity-storage device 3 for the engine restarting is not ensured.

Meanwhile, when the determination in the step S2 is NO, that is, when it is confirmed that the total value GA of the consumptive electric current of the first electric load 15 and the consumptive electric current of the second electric load 23 is the rated current value (20 A) or smaller, it is determined whether or not the remaining electric power ZA of the second electricity-storage device 6 detected by the second voltage detector 10 is greater than the consumptive electric power necessary for the engine restarting (step S5). When the determination in the step S5 is NO, that is, when it is confirmed that the remaining electric power ZA of the second electricity-storage device 6 is so small (short) that there is a possibility of a lack of supplying the above-described necessary consumptive electric power when restarting the engine, the auto-stop prohibition signal is outputted to the auto-stop controller 29 (step S6) and the generated electric current by the generator 4 is supplied to the second electric load 23 and the first electric load 15 as well as the second electricity-storage device 6 for charging (step S7).

That is, in the normal state in which the bypass relay 18 on the second feeder circuit 19 is made in the OFF state and the coupling relay 26 on the coupling line 27 is made in the ON state as shown in FIG. 3, the generator 4 is driven and the generated electric current by the generator 4 is supplied to the second electricity-storage device 6 for charging, the first electric load 15 of the navigation device 11 and the like via the DC/DC convertor 16 on the first feeder circuit 17, and the first electricity-storage device 3 and the second electric load 23 via the coupling line 27.

When the determination in the step S5 is YES, that is, when it is confirmed that the remaining electric power ZA of the second electricity-storage device 6 is greater than the consumptive electric power necessary for the engine restarting after the engine stopping automatically, the auto-stop prohibition signal is outputted to the auto-stop controller 29 so that a control to automatically stop the engine is executed (step S8). Then, it is determined whether or not there is a possibility that the remaining electric power ZA of the second electricity-storage device 6 may become smaller than the consumptive electric power necessary for the engine restarting after the engine stopping automatically due to the consumption of the power of the second electricity-storage device 6 or the like (step S9). When the determination in this step is YES, a control signal to stop outputting of the DC/DC convertor 16 on the first feeder circuit 17 is outputted (step S10), then the control sequence returns.

Herein, when the outputting of the DC/DC convertor 16 is stopped, as shown in FIG. 6, the electric power from the first electricity-storage device 3 is supplied to the second electric load 23 of the power steering device 21 and the like as well as the first electric load 15 of the navigation device 11 and the like via the coupling line 27. Thereby, when restarting the engine after the engine stopping automatically, the lack of electric power of the second storage electricity-storage device 6 can be effectively restrained from occurring, so that it can be prevented that the first electric load 15 of the navigation device 11 and the like does not work.

Further, when the determination in the step S1 is YES, that is, when the state in which the bypass relay 18 is in the ON state as shown in FIG. 4 is confirmed, for example, the state in which the electric current generated by the generator 4 is supplied to the first electricity-storage device 3 and the second electric load 23 of the power steering device 21 and the like via the second feeder circuit 19 for charging the first electricity-storage device 3 as well as to the first electric load 15 of the navigation device 11 and the like is confirmed, it is determined whether or not a condition for making the bypass relay 18 in the OFF state is met (step S11).

When the determination in the step S11 is NO, that is, when it is confirmed that the condition for making the bypass relay 18 in the OFF state is not met, the control sequence proceeds to the above-described step S3, where the auto-stop prohibition signal is outputted to the auto-stop controller 29. Then, in step S4, the generated electric current by the generator 4 is supplied to the first electricity-storage device 3, the second electric load 23 and the first electric load 15.

Meanwhile, when the determination in the step S11 is YES, that is, when it is confirmed that there is no need to supply the electric current from the generator 4 to the first electric load 15, the second electric load 23 and the like because the total value GA of the consumptive electric current of the first electric load 15 and the consumptive electric current of the second electric load 23 becomes smaller than the rated output current of the DC/DC convertor 16 (20 A, for example), a control signal to make the bypass relay 18 in the OFF state is outputted (step S12).

Then, it is determined whether or not the remaining electric power ZA of the second electricity-storage device 6 is greater than the consumptive electric power necessary for the engine restarting after the engine stopping automatically (step S13). When the determination in the step S13 is NO, that is, when it is confirmed that the remaining electric power ZA of the second electricity-storage device 6 is so small (short) that the above-described necessary consumptive electric power is not be supplied, the second electricity-storage device 6 is charged with the generated electric current by the generator 4 (step S14).

That is, in the state in which the coupling relay 26 on the coupling line 27 is made in the ON state and the bypass relay 18 on the second feeder circuit 19 is made in the OFF state as shown in FIG. 3, the generator 4 is driven and the generated electric current by the generator 4 is supplied to the first electric load 15 of the navigation device 11 and the like via the DC/DC convertor 16 on the first feeder circuit 17 and the first electricity-storage device 3 and the second electric load 23 via the coupling line 27, as well as charging the second electricity-storage device 6.

Then, returning to the step S13, it is determined whether or not the remaining electric power ZA of the second electricity-storage device 6 becomes greater than the above-described necessary consumptive electric power. At the timing this determination becomes YES, the control sequence proceeds to the step S8, where the auto-stop prohibition signal is outputted to the auto-stop controller 29 so that the control to automatically stop the engine is executed.

Figure 8:
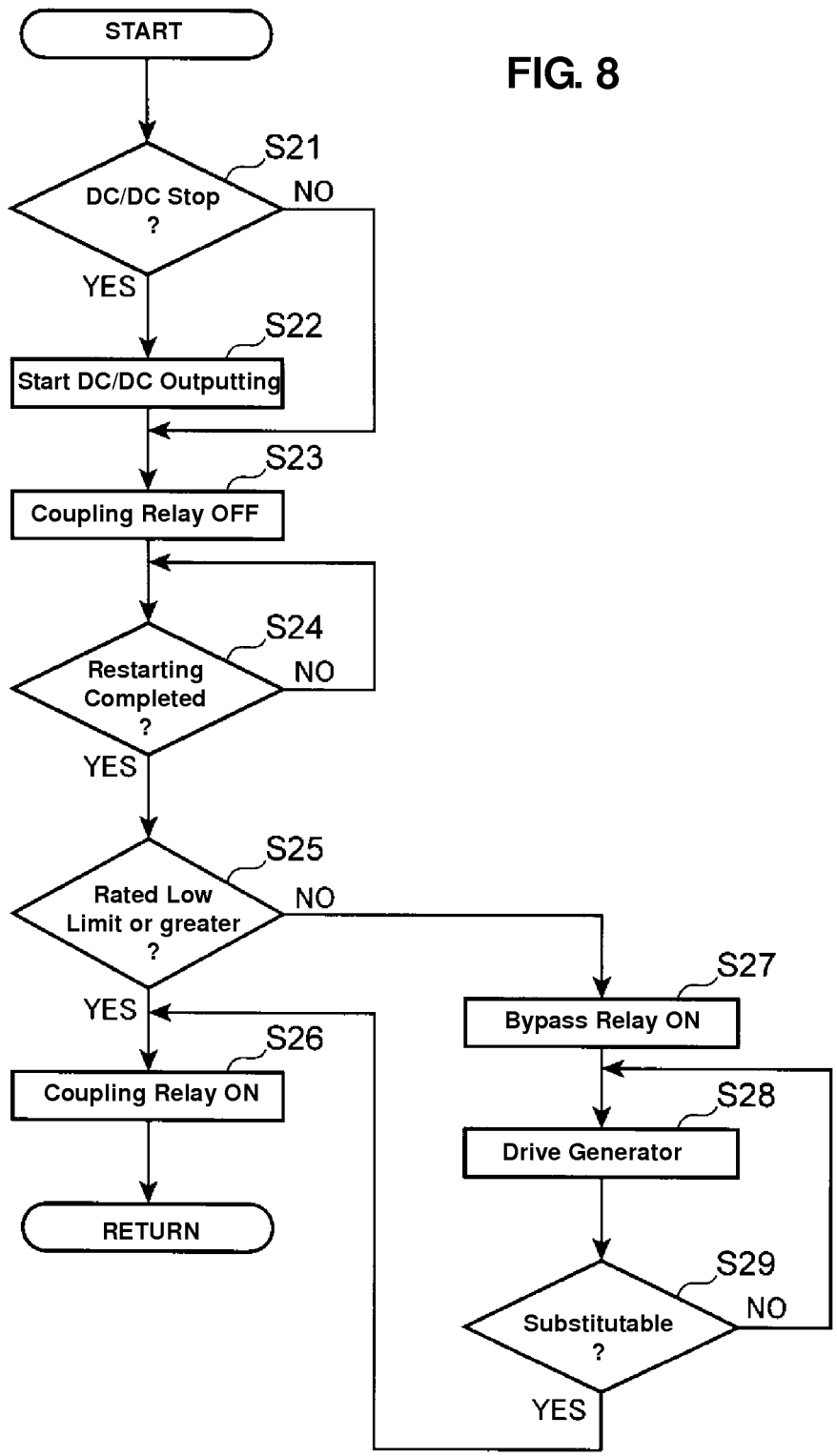
FIG. 8 is a flowchart showing the control operation of the power-supply control apparatus when an engine is restated.

Next, operations of the control which is executed by the controller 30 when it is determined by the auto-stop controller 29 that the condition for restarting engine is met will be described referring to a flowchart shown in FIG. 8. When the control sequence starts, it is determined whether or not the DC/DC convertor 16 on the first feeder circuit 17 is in a state in which outputting of the DC/DC convertor 16 is stopped (refer to FIG. 6) (step S21). When the determination is NO, the control sequence proceeds to step S23 described below.

When the determination in the step S21 is YES, a demand signal of starting the outputting of the DC/DC convertor 16 is outputted (step S22), then a control signal of making the coupling relay 26 on the coupling line 27 in the OFF state is outputted (step S23), so that the bypass relay 18 on the second feeder circuit 19 and the coupling relay 26 on the coupling line 27 are made in the OFF state, respectively, as shown in FIG. 5. Thereby, the supply of the electric power from the second electricity-storage device 6 to the second electric load 23 and the like is stopped, but the electric power of the first electricity-storage device 3 is supplied to the second electric load 23. Accordingly, the respective electric loads 15, 23 can be made work properly without causing any lack of electric power of the second electricity-storage device 6 when restarting engine.

Then, it is determined whether or not the engine restarting is completed (step S24). At the timing the determination is YES, it is determined whether or not the output voltage of the DC/DC convertor 16 can be maintained at its rated low limit of 12V or greater (step S25). When the determination is YES, a control signal of making the coupling relay 26 on the coupling line 27 in the ON state is outputted (step S26), so that a driving state goes to the normal state.

When the determination in the step S25 is NO, that is, when it is determined that the output voltage of the DC/DC convertor 16 may decrease below the rated low limit (12V), a control signal of making the bypass relay 18 on the second feeder circuit 19 in the ON state is outputted (step S27). Then, the generator 4 is driven to generate the electric current with the voltage of about 12-14V (step S28). Thereby, as shown in FIG. 4, the generated electric current by the generator 4 is supplied to the first electricity-storage device 3 and the second electric load 23 via the second feeder circuit 19, and to the first electric load 15 via the first feeder circuit 17. Herein, the coupling relay 26 on the coupling line 27 may be made in the ON state so that the generated electric current by the generator 4 is supplied from the bypass relay 18 on the second feeder circuit 19 to the first electric load 15 of the navigation device 11 and the like via the coupling line 27.

Then, it is determined whether or not the necessary electric power can be supplied from the DC/DC convertor 16 in place of the generated electric current by the generator 4, that is, whether or not the consumptive electric power of the first electric load 15 and the second electric load 23 can be supplied by the supply electric power of the DC/DC convertor 16 (step S29). When the determination is NO, the control sequence returns to the step S28 to repeat the above-described controls. When the determination in the step S29 is YES, the control sequence proceeds to the above-described step S26, so that the bypass relay 18 on the second feeder circuit 19 is made in the OFF state. Thus, the driving state goes to the normal state shown in FIG. 3.

As described, the power-supply control apparatus of a vehicle comprises the first electricity-storage device 3 to supply the electric power to the starter for starting engine 20, the generator 4 to convert the kinetic energy of the vehicle during the vehicle deceleration to the electric energy for the energy recovery, the second electricity-storage device 6 coupled to the generator 4 to store the electric power from the generator 4 thereat, the first feeder circuit 17 coupling the second electricity-storage device 6 to the electric load 15 with the relatively-small electric-load capacity, such as the audio device or the meter unit, via the DC/DC convertor 16, the coupling line 27 coupling the second electricity-storage device 6 to the first electricity-storage device 3 via the coupling relay 27, and the controller 30 to control the electric power passing through the first feeder circuit 17 and the coupling line 27, wherein the controller 30 executes the control to make the coupling relay 26 on the coupling line 27 in the OFF state when the starter 20 operates. Thereby, the electric power can be properly supplied to the various electric loads provided in the vehicle with a simple constitution.

That is, the second electricity-storage device 6, such as the capacitor having the quicker charge-and-discharge performance, is provided in addition to the normal first electricity-storage device 3, such as the lead-acid battery, and the generator 4 generates the electric current with the voltage of about 25V during the vehicle deceleration or the vehicle's traveling on a downhill, and the generated electric current is supplied to the second electricity-storage device 6 for charging this device 6. Further, the electric power stored at the second electricity-storage device 6 is supplied to the first electric load 15 of the navigation device 11 and the like as well as the first electricity-storage device 3 and the second electric load 23 via the DC/DC convertor 16 decreasing the voltage of this electric power to about 14V. Accordingly, the fuel efficiency of the vehicle can be improved by utilizing the regenerative energy during the vehicle deceleration or the like.

Further, according to the above-described embodiment of the vehicle equipped with the auto-stop controller 29 to automatically stop the engine when the condition for automatically stopping is met and to automatically restart the engine by operating the starter 20 when the condition for automatically restarting is met, the coupling relay 26 on the coupling line 27 is made in the OFF state as shown in FIG. 5 when the starter 20 operates to restart the engine, thereby stopping the supply of the electric power from the second electricity-storage device 6 to the first electricity-storage device 3 and the second electric load 23 of the starter 20 and supplying the electric power from the first electricity-storage device 3 to the second electric load 23. Accordingly, any improper situation in which the sufficient electric current may not be supplied to the respective electric loads 15, 23 from the second electricity-storage device 6 via the DC/DC convertor 16 due to a lack of electric power of the second electricity-storage device 6 when restarting the engine can be effectively prevented from occurring, so that it can be effectively prevented that the electric loads 15, 23 do not work against the grain.

Herein, in place of the above-described embodiment having the constitution that the coupling relay 26 on the coupling line 27 is made in the OFF state when restarting the engine automatically stopped by the auto-stop controller 29 or in addition to this constitution, the coupling relay 26 on the coupling line 27 may be made in the OFF state by the controller 30 when staring the engine by operating the starter 20 through an operation of an ignition switch after the engine is stopped by the operation of the ignition switch. In this case, likewise, any improper situation in which the sufficient electric current may not be supplied to the respective electric loads 15, 23 from the second electricity-storage device 6 via the DC/DC convertor 16 due to the lack of electric power of the second electricity-storage device 6 when starting the engine can be effectively prevented from occurring.

Further, according to the above-described embodiment, in the vehicle equipped with the auto-stop controller 29 of the engine and the voltage detector 10 to detect the voltage (the remaining electric power ZA) of the second electricity-storage device 6, the auto-stop controller 29 is prohibited from automatically stopping the engine in a case in which the voltage of the second electricity-storage device 6 detected by the voltage detector 10 is the specified value or smaller, that is, when it is determined that the above-described remaining electric power ZA is smaller than the consumptive electric power necessary for restarting engine after the engine stopping automatically. Any problem which may be caused by executing the auto-stop control of the engine despite the state in which the above-described consumptive electric power may not be supplied due to the insufficient remaining electric power of the second electricity-storage device 6, for example, any improper situation in which the sufficient electric current is not supplied to the electric loads 15, 23 so that the electric loads 15, 23 may not work can be effectively prevented from occurring when restarting the engine.

Moreover, as described in the above-described embodiment, in a case in which the second electricity-storage device 6 is comprised of the capacitor which has the quicker charge-and-discharge performance than the lead-acid battery or the like, the electric current generated by the generator 4 can be quickly supplied to the second electricity-storage device 6 for charging. Further, the electric power stored at the second electricity-storage device 6 is supplied to the first electric load 15 of the navigation device 11 and the like with a proper reduction to about 14V by means of the DC/DC convertor 16, so that the electric power can be effectively used.

Also, as described in the above-described embodiment, the controller 30 executes a control to stop outputting of the DC/DC convertor 16 in a case in which the electric power stored at the second electricity-storage device 6 is consumed and decreased below the consumptive electric power necessary for the engine restarting when the engine is in the automatically-stop state. Thereby, the consumption of the electric power by the second electricity-storage device 6 is restrained, so that it can be prevented that the first electric load 15 and the like do not work due to a lack of electric power of the second electricity-storage device 6 when restarting the engine after the engine auto-stop.

Further, as described in the above-described embodiment, when the outputting of the DC/DC convertor 16 is stopped, the electric power from the first electricity-storage device 3 is supplied to the first electric load 15 and the like. Thereby, when restarting the engine after the engine stopping automatically, the lack of electric power of the second storage electricity-storage device 6 can be effectively restrained from occurring, so that it can be prevented that the first electric load 15 and the like do not work.

Moreover, as described in the above-described embodiment, in a case in which the large amount of electric current is consumed by the first electric load 15 and the like, the controller 30 executes the control to supply the electric current generated by the generator 4 to the first electricity-storage device 3 so that the consumption of the electric power by the second electricity-storage device 6 is restrained. Thereby, it can be prevented that the sufficient electric current is not supplied to the first electric load 15 and the like from the second electric-storage device 6 via the DC/DC convertor 16 during the engine stop so that the first electric load 15 and the like may not work properly, or that the large amount of electric current is supplied to the first electric load 15 and the like from the first electricity-storage device 3 so that the enough electric power of the first electricity-storage device 3 for the engine restarting may not be ensured.

Herein, in place of the above-described embodiment comprising the second electricity-storage device 6 comprised of the plural capacitor with electric double layers, a hybrid capacitor, such as a lithium-ion capacitor, or a high-power lithium-ion battery may be applied.

Further, according to the above-described embodiment, when it is detected by the second voltage detector 10 that the voltage of the second electricity-storage device 6 is the predetermined standard value (16V) or greater at the timing it is confirmed according to the output signal from the ignition switch detector 24 that the ignition switch is tuned off, the discharge control by the discharger 25 is executed. Thereby, the upper limit of the charged voltage can be set at a considerably high voltage comparing with the lead-acid battery or the like. Accordingly, the second electricity-storage device 6, which is comprised of the capacitor or the like which tend to deteriorate in an early stage due to keeping the stored voltage at a relatively high value, can be effectively prevented from deteriorating in the early stage improperly.

The present invention should not be limited to the above-described embodiment and modification, and any other further modifications or improvements may be applied within the scope of a sprit of the present invention.

What is claimed is:

1. A power-supply control apparatus of a vehicle, comprising:
    a first electricity-storage device to supply electric power to a starter for starting engine;
    a generator to convert kinetic energy of the vehicle during a vehicle deceleration to electric energy for energy recovery;
    a second electricity-storage device coupled to the generator to store the electric power from the generator thereat;
    a feeder circuit coupling the second electricity-storage device to an electric load via a DC/DC convertor;
    a coupling line coupling the second electricity-storage device to the first electricity-storage device via a coupling relay; and
    a controller to control the electric power passing through the feeder circuit and the coupling line,
    wherein said controller executes a control to make the coupling relay on said coupling line in an OFF state when said starter operates.

2. The power-supply control apparatus of a vehicle of claim 1, wherein said electric load comprises plural electric loads with a relatively-small electric-load capacity.

3. The power-supply control apparatus of a vehicle of claim 1, further comprising:
    an auto-stop controller to automatically stop the engine when a condition for automatically stopping is met and to automatically restart the engine by operating said starter when a condition for automatically restarting is met; and
    a voltage detector to detect a voltage of said second electricity-storage device,
    wherein said auto-stop controller is prohibited from automatically stopping the engine in a case in which the voltage of the second electricity-storage device detected by said voltage detector is a specified value or smaller.

4. The power-supply control apparatus of a vehicle of claim 1, wherein said second electricity-storage device is a capacitor which has a quicker charge-and-discharge performance than said first electricity-storage device.

5. The power-supply control apparatus of a vehicle of claim 3, wherein said second electricity-storage device is a capacitor which has a quicker charge-and-discharge performance than said first electricity-storage device.

6. The power-supply control apparatus of a vehicle of claim 1, wherein said controller executes a control to stop outputting of said DC/DC convertor in a case in which the electric power stored at said second electricity-storage device is consumed and decreased below a specified value necessary for restarting engine when the engine is in an automatically-stop state.

7. The power-supply control apparatus of a vehicle of claim 3, wherein said controller executes a control to stop outputting of said DC/DC convertor in a case in which the electric power stored at said second electricity-storage device is consumed and decreased below a specified value necessary for restarting engine when the engine is in an automatically-stop state.

8. The power-supply control apparatus of a vehicle of claim 6, wherein when the outputting of the DC/DC convertor is stopped, the electric power from said first electricity-storage device is supplied to said electric load.

9. The power-supply control apparatus of a vehicle of claim 7, wherein when the outputting of the DC/DC convertor is stopped, the electric power from said first electricity-storage device is supplied to said electric load.

10. The power-supply control apparatus of a vehicle of claim 1, in a case in which a large amount of electric current is consumed by said electric load, said controller executes a control to supply an electric current generated by said generator to said first electricity-storage device so that consumption of the electric power by said second electricity-storage device is restrained.

11. The power-supply control apparatus of a vehicle of claim 3, in a case in which a large amount of electric current is consumed by said electric load, said controller executes a control to supply an electric current generated by said generator to said first electricity-storage device so that consumption of the electric power by said second electricity-storage device is restrained.

12. A power-supply control apparatus of a vehicle, comprising:
- a first electricity-storage device to supply electric power to a starter for starting engine;
- a generator to convert kinetic energy of the vehicle during a vehicle deceleration to electric energy for energy recovery;
- a second electricity-storage device coupled to the generator to store the electric power from the generator thereat, the second electricity-storage device being a capacitor which has a quicker charge-and-discharge performance than said first electricity-storage device;
- a feeder circuit coupling the second electricity-storage device to an electric load via a DC/DC convertor;
- a coupling line coupling the second electricity-storage device to the first electricity-storage device via a coupling relay;
- a controller to control the electric power passing through the feeder circuit and the coupling line;
- an auto-stop controller to automatically stop the engine when a condition for automatically stopping is met and to automatically restart the engine by operating said starter when a condition for automatically restarting is met; and
- a voltage detector to detect a voltage of said second electricity-storage device, wherein said controller executes a control to make the coupling relay on said coupling line in an OFF state when said starter operates, said auto-stop controller is prohibited from automatically stopping the engine in a case in which the voltage of the second electricity-storage device detected by said voltage detector is a specified value or smaller, said controller executes a control to stop outputting of said DC/DC convertor in a case in which the electric power stored at said second electricity-storage device is consumed and decreased below a specified value necessary for restarting engine when the engine is in an automatically-stop state, when the outputting of the DC/DC convertor is stopped, the electric power from said first electricity-storage device is supplied to said electric load, and in a case in which a large amount of electric current is consumed by said electric load, said controller executes a control to supply an electric current generated by said generator to said first electricity-storage device so that consumption of the electric power by said second electricity-storage device is restrained.

* * * * *